_(12)_ United States Patent
Moran et al.

(10) Patent No.: US 8,924,795 B2
(45) Date of Patent: Dec. 30, 2014

(54) DISTRIBUTED DEBUG SYSTEM

(75) Inventors: Gil Moran, Meitar (IL); Evgeni Ginzburg, Petah Tikva (IL); Adi Katz, Ramat Gan (IL); Erez Shaizaf, Moshav Nir Chen (IL)

(73) Assignee: Freescale Semiconductor, Inc., Austin, TX (US)

( * ) Notice: Subject to any disclaimer, the term of this patent is extended or adjusted under 35 U.S.C. 154(b) by 350 days.

(21) Appl. No.: 13/393,589

(22) PCT Filed: Sep. 30, 2009

(86) PCT No.: PCT/IB2009/054284
§ 371 (c)(1),
(2), (4) Date: Mar. 1, 2012

(87) PCT Pub. No.: WO2011/039570
PCT Pub. Date: Apr. 7, 2011

(65) Prior Publication Data
US 2012/0185730 A1    Jul. 19, 2012

(51) Int. Cl.
*G06F 11/00* (2006.01)
*G06F 11/36* (2006.01)

(52) U.S. Cl.
CPC .................. *G06F 11/3648* (2013.01)
USPC ............. 714/45; 714/724; 714/725; 714/726; 714/727; 714/729

(58) Field of Classification Search
USPC .................... 714/45, 724–727, 729
See application file for complete search history.

(56) References Cited

U.S. PATENT DOCUMENTS

| 5,642,478 | A | 6/1997 | Chen et al. |
|---|---|---|---|
| 6,134,676 | A | 10/2000 | VanHuben et al. |
| 7,080,283 | B1 * | 7/2006 | Songer et al. .................. 714/30 |
| 7,200,776 | B2 | 4/2007 | Harris |
| 7,913,118 | B2 * | 3/2011 | Shih et al. ...................... 714/28 |
| 7,917,818 | B2 * | 3/2011 | Niijima ........................ 714/724 |
| 8,402,442 | B1 * | 3/2013 | Chan et al. .................... 717/127 |
| 8,423,829 | B2 * | 4/2013 | Yamagata et al. ............. 714/33 |
| 8,683,265 | B2 * | 3/2014 | Rentschler et al. ............ 714/30 |
| 2001/0004766 | A1 | 6/2001 | Koyama |
| 2006/0218448 | A1 | 9/2006 | Allue et al. |
| 2007/0174815 | A1 | 7/2007 | Chrysanthakopoulos |
| 2012/0151263 | A1 * | 6/2012 | Rentschler et al. ............ 714/30 |

OTHER PUBLICATIONS

International Search Report and Written Opinion correlating to PCT/IB2009/054284 dated Jun. 28, 2010.

* cited by examiner

*Primary Examiner* — Joshua P Lottich

(57) ABSTRACT

A distributed debug system including processing elements connected to perform a plurality of processing functions on a received data unit, a debug trap unit, a debug trace dump logic unit, and a debug initiator unit is provided. At least two of the processing elements include a debug trap unit that has a first debug enable input and output, and a first debug thread. The first debug thread holds at least a first debug trap circuit having a match signal output connected to the first debug enable output. The first debug trap circuit filters a part of the data unit, compares a filtering result with a debug value, and provides a match signal to the match signal output. The debug trace dump logic unit dumps debug trace data to a buffer associated with the data unit on reception of a match event. The debug initiator unit includes a debug initiator output connected to the first debug enable input of the debug trap unit of one processing element, and a debug initiator input connected to the first debug enable output of the debug trap unit of another processing element.

20 Claims, 3 Drawing Sheets

DISTRIBUTED DEBUG SYSTEM

FIELD OF THE INVENTION

This invention in general relates to data processing systems with multiple processing elements and more specifically to a distributed debug system.

BACKGROUND OF THE INVENTION

An embedded system is a computer system designed to perform one or a few dedicated functions, often with real-time computing constraints. It is embedded as part of a complete device. For debugging in an embedded system that holds distributed Processing Elements (PE) it is desired to get high visibility of internal data flows to analyze and debug decision points. For example, such a system is typical for streaming data processing such as streaming media processing, e.g. streaming video or audio. For example, communication accelerators with PCD (Parse, Classify and Distribute) steps carried out on the stream of packets may serve as an example for a system for streaming data processing. However, debugging a system having distributed processing elements is difficult due to for example the need for observing complex debug conditions in each PE and at the same time tracking propagation of conditions between different PE and may lead to either huge amounts of debug trace data or incomplete data.

A PE may be any device or circuit configured for data processing, for example any type of processor, such as a central processing unit (CPU), a graphics processor unit (GPU), any general purpose processor, a microcontroller unit (MCU), any multi core networking device, multi core processor, a processor core or a functional area on a processor or other semiconductor device, as well as a data parser, or any type of decoder or encoder circuit, just to name a few.

U.S. Pat. No. 5,642,478 shows a dedicated debugging facility for tracing hardware and software faults in a distributed digital system. Each processing node contains an event data capture circuit and each capture circuit is associated with a corresponding local trace data memory. In this local history buffer system the trace data is continuously accumulated in each PE local memory in order to provide history debug data in case of a system fault, therefore allowing for a post processing procedure. The association of distributed trace data between PE is achieved by timestamp sorting during software analysis.

U.S. Pat. No. 7,200,776 B2 shows a system for generating trace data in a computing system. The trace data is stored without direct association of trace data to data units in a common place defined at configuration by a single, not distributed, debug trace entity.

U.S. Pat. No. 6,134,676 shows a programmable hardware event monitoring method. It describes an on chip logic analyzer function that selects predefined hardware events that have been predefined at design stage and can be used as part of an equation to trigger a debug trace.

SUMMARY OF THE INVENTION

The present invention provides a distributed debug system and a computer program product as described in the accompanying claims.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 1:
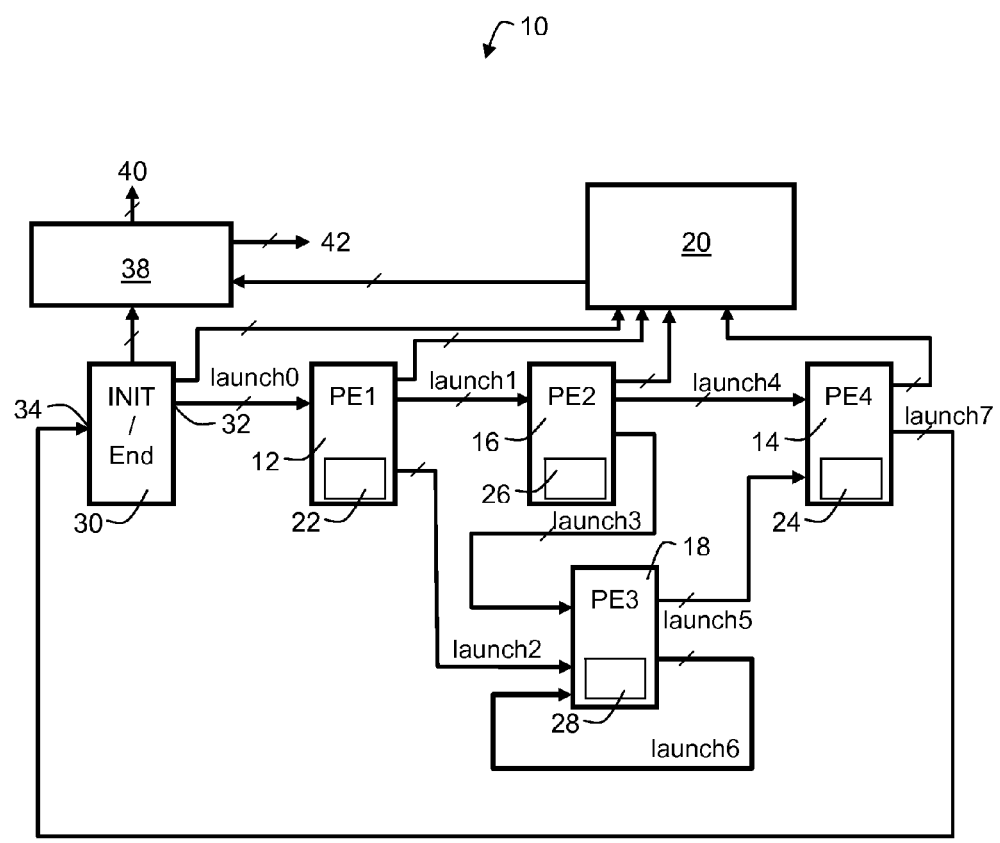
FIG. 1 shows a schematic block diagram of an example of an embodiment of a distributed debug system.

Referring to FIG. 1, a schematic block diagram of an example of an embodiment of a distributed debug system 10 is shown. The shown distributed debug system 10 may comprise a plurality of processing elements 12, 14, 16, 18 connected to sequentially perform a plurality of processing functions on a received data unit. At least a first 12 and a second 14 of the processing elements may comprise a debug trap unit 22, 24 having a first debug enable input, a first debug enable output, a first debug thread comprising at least a first debug trap circuit having a match signal output connected to the first debug enable output and adapted to filter at least a part of the data unit, compare a filtering result with a configurable debug value and provide a match signal to the match signal output when a comparison result indicates a successful local match; and a debug trace dump logic unit adapted to dump a configurable amount of debug trace data to a buffer 20 associated with the data unit on reception of a match event. And the system 10 may comprise a debug initiator unit 30 having a debug initiator output 32 connected to the first debug enable input of the debug trap unit 22 of the first processing element 12, and a debug initiator input 34 connected to the first debug enable output of the debug trap unit 24 of the second processing element 14.

The received data unit may for example be a streaming data unit, a packet in a data stream.

Each debug trap circuit may implement a circuit for checking one of a set of local debug conditions, together implementing a potentially complex debug equation. A successful local match may therefore confirm that the debug condition tested by a specific debug trap circuit is met. If all debug conditions tested by all debug traps of a debug thread are met, the confirmed system level match event may be communicated to a debug dump unit 38 for sending the data for example to a memory dump 40 or a debug port 42 for transferring the debug trace data to an analyzer unit.

The shown system may provide flexibility to create complex debug equations that trap local conditions in each PE as well as conditions propagating from PE to PE and may allow capturing combined system level events. This capability may be useful to filter out unrelated streaming data from the debug dump and reduce the debug data bandwidth for off-chip logic attached to the debug port 42 or on-chip processor analysis at real time receiving the memory dump 40. It may allow for system level debug that enables pin pointing specific problems and verifying configuration and performance, since each matching packet may be fully debug traced.

A debug thread in the shown system may be a process distributed between multiple PE along the flow of the received data unit. Debug thread here may also refer to a chain of debug trap circuits used for carrying out the thread processing of system level debug equations. For example, in a communication system with PCD each packet flows through certain PE and each of them may implement a different processing stage and execute a different processing function on the received packets.

In the described distributed debug system, the first debug enable output of the debug trap unit of the first processing element may be connected to the first debug enable input of the debug trap unit of the second processing element. The connection between the debug trap unit (22) of the first PE (12) and the debug trap unit (24) of the second PE (14) may be a direct connection. However, when the plurality of processing elements having debug trap units comprises more than the first and the second PE, the connection may be an indirect connection, as shown in FIG. 1. For example first debug enable inputs and outputs of processing elements may be connected such that a serial connection of processing elements may be established (For example FIG. 1, PE1 (12), PE2 (2), PE4 (14)).

When a debug trap unit 22, 26, 28 of a PE 12, 16, 18 receives a debug enable signal at its debug enable input it may clear the signal for the next debug trap unit of the next PE along the processing flow when no match can be detected, or it may leave its debug enable output connected to the debug enable input of the next PE asserted when a match is detected. This functionality may effectively implement a logical AND function between distributed PE match results. When a match can be detected the debug trace dump logic of the PE may dump a configurable amount of debug trace data to a buffer attached to the processed data unit and update a debug pointer for the next PE, pointing to the next location of debug trace dump. In FIG. 1, launch<x> may for example hold 1 debug bit for the debug thread (or N bits for N debug threads) and a pointer to the current debug trace data location. However, a debug trace unit may not be used for comparison and may pass debug data as "always match" and may or may not dump trace data.

In an embodiment of the distributed debug system other connections between debug trace units of processing elements may be applied, allowing for implementation of other logical functions such as an OR function.

And at least some PE having a debug trace unit may be configurable to establish an AND/OR connection to the debug enable outputs of preceding PE.

In the shown distributed debug system 10 data may be accumulated along a path of the data flow through the set of processing elements 12, 14, 16, 18 and by that may enable full analysis of the data processing in the distributed system 10. A debug thread that gets match on all the PE along its flow may be considered to have a successful system level match and the debug buffer 20 may accumulate trace data dumped by all the PE along its flow.

The debug trace data may leave the system together with its associated data unit or may immediately be discarded when no match occurs at the system level. Instead of accumulating a local history in each processing element, the shown system may allow for a real time data stream tracing.

The shown debug initiator unit 30 may assert a debug indication and may generate a debug enable signal for the first debug trap unit 22 of the first PE 12 connected to the debug initiator unit 30, and may initialize a debug pointer to a first entry of debug trace. The debug initiator unit 30 may be implemented as a single circuit. However, it may be implemented as a set of sub-units, for example a first comprising the debug enable output 34 and a second having the debug enable input 34.

The shown multiple processing elements 12, 14, 16, 18 may have debug trap units 22, 24, 26, 28, each holding one or more debug trap circuits per thread with each trap separately configured to match selected fields and mask and use selected compare operations to a given value. One or more parallel debug threads may run through each debug trap unit. When a debug thread holds a plurality of debug trap circuits they may be serially connected to each other to build a complex match equation comprising a plurality of match conditions within the same debug trap unit. A match condition in a thread of a debug trap unit may for example be fulfilled when a combination of all of its serial debug trap circuits yields a logical "1" or "true" result, thus building a complex local condition.

Figure 2:
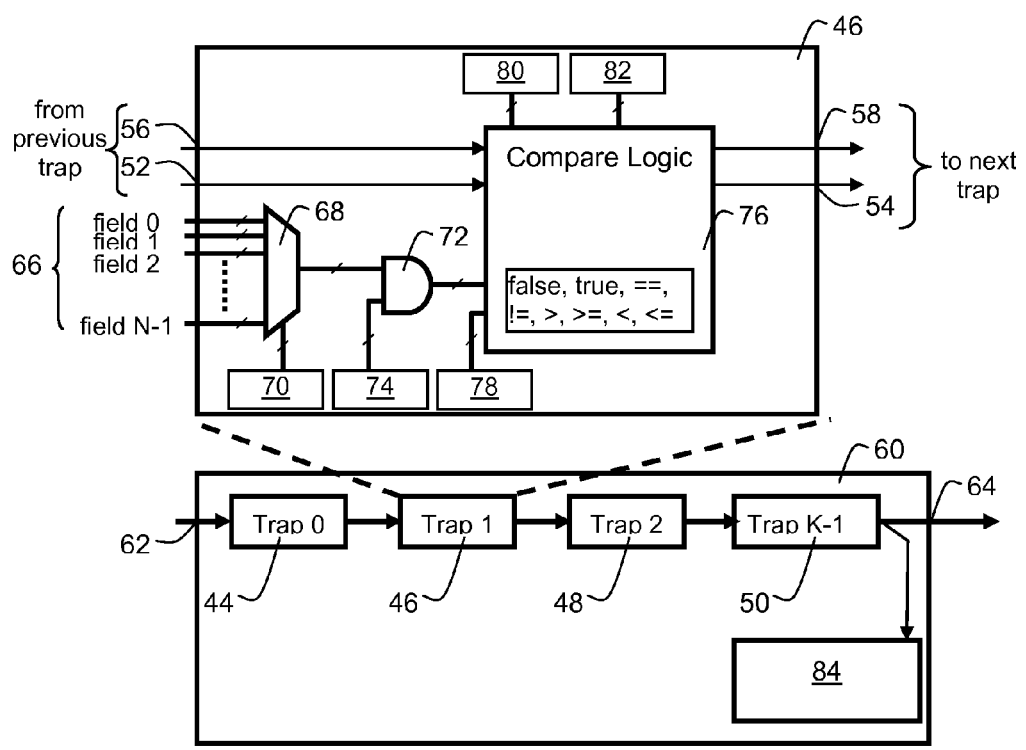
FIG. 2 shows a schematic diagram of an example of a debug trap circuit according to an embodiment of a distributed debug system.

Referring now also to FIG. 2, a schematic diagram of an example of a debug trap circuit according to an embodiment of a distributed debug system is shown. The presented debug trace dump logic unit 84 may be configured to dump a programmed amount of trace data on a successful match event. The data may be dumped to a buffer 20 associated with the processed data (for example, writing debug trace data to the same buffer or streaming data in a pre-assigned location, and updating the debug pointer for the next PE). In embodiments of the system, the dump logic 84 may hold protection from exceeding bounds of a limited debug buffer or use a trace buffer structure such as a linked list pointed once from the data stream buffer. This may allow for very high bandwidth for debug trace data and direct association of trace dump data to a processed data unit.

In the distributed debug system the first debug thread of at least one of the processing elements may comprise at least a second debug trap circuit; each of the debug trap circuits comprising a match signal input 52, a match signal output 54, an AND/OR input 56 and an AND/OR output 58; the inputs of the second debug trap circuit connected to the corresponding outputs of the first debug trap circuit.

The shown debug trap unit 60 may comprise the first debug thread with debug trap circuits 44, 46, 48, 50. The debug trap unit 60 may comprise a debug enable input 62 connected to the match signal input of debug trap circuit 44 and a debug enable output 64 connected to the match signal output of debug trap circuit 50.

Creating match conditions for a debug trap unit 60 of a PE may be done by utilizing one or more debug traps 44, 46, 48, 50 which may be concatenated with logical AND/OR. In a PE the match event per thread may be implemented by a series of configurable debug traps with each trap having AND/OR relation to the next trap (if exists) and therefore may allow for building complex equations. A complex debug condition may comprise a series or chain of debug traps, with each debug trap circuit checking part of the equation. The debug trap circuits may be either uniform or customized.

This capability may enable producing selective debug data which may fit to the bandwidth of the system debug port 42 or to the debug processing capability of on chip cores.

A debug trap circuit may for example be configured to select a PE local field from a variety of sources or fields from different PE hardware locations 66, use a mask to select cared bits, and then match the result to a programmed debug value according to the programmed comparison scheme (==, !=, >=, >, <=, <, always-match, no-match). The field selection may for example be implemented using a multiplexer circuit 68 with a field selection configuration unit 70. The selected field may be provided to a logic circuit such as an AND gate 72 also receiving a mask configuration 74. The result of this filtering may be provided to a comparison logic 76 receiving comparison value configuration CMPVAL 78, comparison configuration CMPOP 80 and AND/OR configuration 82.

For example, the following two-trap programming may select a value range while a third trap may be unused:

Trap 1: Field:A, Mask:0x00FF, CMPOP:>, Value:0x0005, AND:1

Trap 2: Field:A, Mask:0x00FF, CMPOP:<=, Value: 0x0010, AND:0

Trap 3: Field:x, Mask:xxxx, CMPOP:no-match, VALUE=xxxx, AND=x

In the shown example a 16 bit field may get a match if its eight least significant bits value is greater than 0x0005 and less than or equal to 0x0010. Since Trap 2 AND field is zero it may get OR relation to Trap 3, and unused Trap 3 is programmed to have "no-match" effectively propagating the result of Trap 2. The same result may for example be achieved by programming AND:1 in Trap 2 and always-match in Trap 3.

Figure 3:
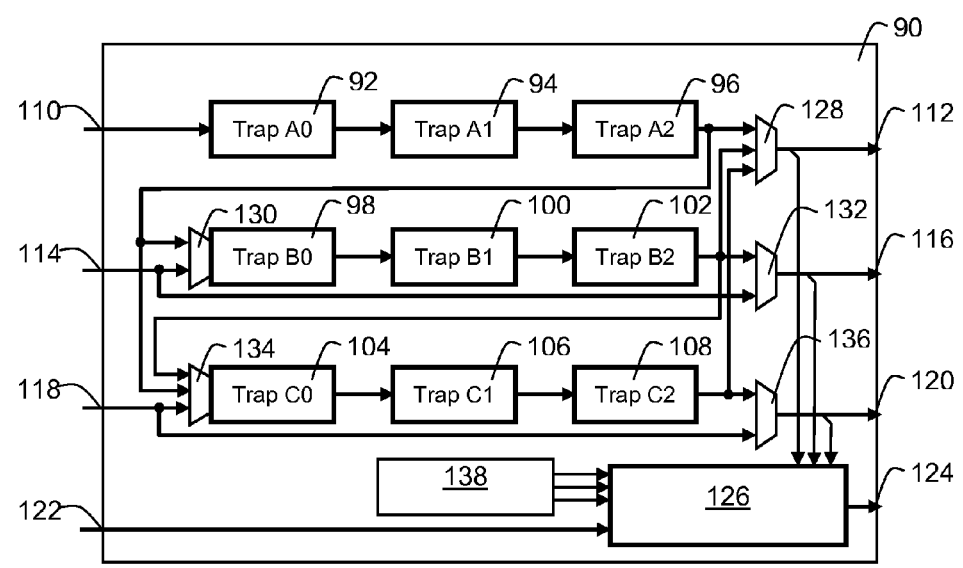
FIG. 3 shows a schematic diagram of an example of a multi-thread debug trap unit according to an embodiment of a distributed debug system.

Referring now also to FIG. 3, a schematic diagram of an example of a multi-thread debug trap unit according to an embodiment of a distributed debug system is shown.

Here, a debug trap unit 90 may comprise at least a second debug thread 98, 100, 102, a second debug enable input 114 and a second debug enable output 116. However, more than two debug threads may be used. As shown, the debug trap unit may for example comprise debug trap units of a first debug thread 92, 94, 96 with input 110 and output 112 and a third debug thread using debug trap circuits 104, 106, 108 and debug enable input 118 and output 120. More debug threads are possible. In addition to high visibility of internal decision points, multiple parallel debug threads may be used on each PE for checking multiple debug match conditions independently at the same data unit. This may for example be implemented by allocating one debug signal per thread.

Hence, it may be possible to have one thread implementing a complex debug equation while multiple independent parallel debug threads with simple equations allow for monitoring several conditions. Distributed debug of a system such as an embedded system with complex datapath flows (such as a hardware communication acceleration system with distributed PCD flow) may be an advantage for system initial setup, real time debug trace and performance analysis. Adding fully configurable hardware based parallel debug threads in each PE and the capability of each processing element to conditionally stop and continue each thread flow and conditionally dump a configured amount of trace data on a match event may enable real time or offline analysis of each debug thread.

The corresponding first debug enable output and input (or first thread enable output and input) of the debug trap unit of a PE may be connected to the corresponding first debug enable (or thread) input and output of a preceding or successive PE (or debug initiator unit). The same holds true for the second, third etc. debug enable output and input. However, it is also within the scope of the described system that different thread outputs of a debug trace unit of a PE connect to thread inputs of different preceding or successive PE.

The described system using parallel debug threads may allow for accumulating debug data across processing elements independently combined with building of complex debug equations in each processing element and may achieve a high flexibility and capability to trace complex events in the system combined in multiple locations.

A trace dump logic unit 126 may be connected to the debug threads having the debug trap circuits to receive the local match events and may be configured to dump a configured amount of debug trace data to a buffer. The trace dump logic unit may for example comprise a debug pointer input 122 for receiving the debug pointer pointing to the current debug trace data and may comprise a debug pointer output 124 for delivering an updated debug pointer to a connected next debug trap unit.

As shown in FIG. 3, each debug trap unit 90 may comprise a trap reassignment logic circuit 128, 130, 132, 134, 136 configured to connect at least one debug trap circuit comprised in one of the debug threads to a debug trap circuit comprised in another of the debug threads when the one of the debug threads is in an always-match condition. In the shown example, the trap reassignment logic circuit 128, 130, 132, 134, 136 may for example comprise configurable connected multiplexer units.

When a debug thread is used for checking a complex match equation which consumes more than the number of its associated debug traps the trap reassignment logic in this collaboration mode may be configurable to reassign debug traps from another thread to this thread. For example {A,B,C} may refer to signals on debug enable outputs 112, 116, and 120 due to non-collaborating threads A, B, and C, {A+B,True,C} may comprise concatenating the debug trap circuits of threads A and B as a single thread, while delivering an always-match on the second debug enable output, {A+C,B,True} may comprise concatenating the debug trap circuits of threads A and C as a single thread, while delivering an always-match on the third debug enable output, {A+B+C,True,True} may comprise concatenating all debug trap circuits of threads A, B and C as a single thread.

The reassignment may be done by concatenating the first trap of the unused thread to the last trap of the extended thread, and connecting the result of the last trap from the unused thread to the final result of the extended thread. To keep the unused thread active on other PE along the system it may implicitly switch it in an "always match" (true) condition, and therefore it may propagate the value of its debug input to its debug output. In addition it may behave like a PE which has a match event and dumps the configured or programmed amount of trace data (verbosity level is set from "no dump" up to full verbosity as needed).

Since the trap reassignment logic circuit may allow for locally extending the number of traps of one debug thread in a debug trap unit of a processing element or engine by reassigning debug traps taken from another debug thread, it may enable trading the complexity of one debug thread match equation versus simpler equations running in parallel threads. The thread that contributed its debug traps to another thread may continue to be active and get implicit match condition, and therefore the thread may remain useable on other processing elements. It may also dump a configured amount of debug trace data as if it had a real match on that thread.

Referring back to FIG. 1, the distributed debug system may comprise a shared storage memory 20 for holding accumulated debug data. The shared storage memory 20 may hold the accumulated debug data or a mix of debug data and streaming data units. This may allow the debug data to be directly associated with the processed data unit. However, instead of writing the debug trace data to the same memory buffer as the data unit other approaches of directly associating debug data and processed data are possible. For example the debug data may be written to another memory location being pointed from a buffer holding the currently processed data unit. It is also within the scope of the described system to directly forward debug trace data from one PE to the next.

The distributed debug system may comprise a trap selection logic adapted to ensure that different data unit parts processed by different debug trap circuits coherently relate to the same data unit. This may ensure that all traps match coherent data (that is selected fields are associated to the same data unit). This trap selection logic may ensure that different fields seen by different traps all coherently relate to the same data unit even when they occur at different clock cycles. In the shown debug trace system meaningful data fields may be selected and their qualify time may be aligned to make sure they all coherently relate to the same data unit.

As shown in FIG. 1, the distributed debug system may comprise the debug dump circuit 38 configured to transfer accumulated debug trace data, for example from the shared memory buffer 20, and the streaming data unit associated with the debug trace data to an analyzer unit. It can be transferred along with its associated stream data to an on-chip debug system, or sent through a debug port off-chip for analysis.

The analyzer unit may be an on-chip analyzer system, analyzing the memory dump 40 provided by the debug dump unit 38. This may for example allow for a high integration of the debug system and the analyzer.

Or the debug dump unit may use its debug port 42 for transferring the data to an analyzer unit in an off-chip analyzer system. This may for example allow for disconnecting the analyzer unit from the system if no debugging is desired. The debug port may for example be an IEEE-ISTO 5001-2003 NEXUS port, that is a standard debugging interface for embedded systems.

Referring back to FIG. 3, the debug trace dump logic unit 126 may be adapted to set different levels of verbosity of the debug trace data. For this, different trace level configurations 138 may be applied to the trace dump logic 126. Debug trace data may be dumped if any of the flows or threads matches with a verbosity level selected to be the highest between the matching flows. The trace data may for example hold length of buffer, matching flow identification, timestamp value and other engine or processing element related data according to the selected verbosity level. It may allow real time debug operation of all the flows or threads or a post processing using less distinctive debug trap equations and high verbosity of the dumped debug data. The amount of trace data may for example be selectable from "no trace", through "minimal trace" and up to "full trace", with number of verbosity levels decided for example by the system implementation.

The amount of debug trace data may for example be set to fit the system capabilities and scenario requirements: On initial system setup it may be expected to use relaxed match conditions and dump verbose debug data for post processing purposes or may be used to check the system configuration and each PE correct operation. During run time a system problem can be hunted by creating complex debug trap equations which selectively identify a suspected event and then dump debug data at a rate that can be analyzed under live data stream conditions. In another scenario the debug trace may be done for performance analysis where it is expected that the PE uses an "always match" condition or match on a specified traced flow, and dump minimal amount of trace data to have low impact on the system performance. In that scenario it would be useful to dump a PE identifier and timestamp data for latency and throughput analysis of the traced data flows.

The distributed debug system may be any system with multiple processing elements. For example the system may be an embedded system. Since an embedded system may be dedicated to specific tasks, it may be optimized in order to reduce the size and cost of the product, or to increase reliability and performance. However, without usage of the shown distributed debug system this optimization may reduce the visibility of internal data flows and debug decision points.

The shown system may be hardware integrated into a system of multiple processing elements. Instead or additionally, a computer program product may comprise code portions for implementing parts of the shown distributed debug system when run on a programmable apparatus. This may for example refer to configuration of debug trap circuits or trace dump logic.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier as a particular computer program product, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims.

Some of the above embodiments, as applicable, may be implemented using a variety of different distributed data processing systems. For example, although FIG. 1 and the discussion thereof describe an exemplary distributed debug system, this exemplary architecture is presented merely to provide a useful reference in discussing various aspects of the invention. Of course, the description has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, the multiple processing elements may be located on a same integrated circuit, for example of a multi-core processor or on a separate integrated circuits or located within another device.

Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media or other media on other computer systems. Such computer readable media may be permanently, removably or remotely coupled to an distributed debug system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. The programmable apparatus may for example comprise a processing device or processing unit being one or more of a group consisting of: microprocessor, central processing unit, a graphics processor, coprocessor, digital signal processor, embedded processor, application specific integrated circuit (ASIC), field programmable gate array (FPGA), a device implementing a state machine, a microcontroller unit (MCU).

Furthermore, the devices may be physically distributed over a number of apparatuses, while functionally operating as a single device. In one embodiment, system 10 is a computer system such as a personal computer system. In another embodiment, system 10 may be comprised in a programmable apparatus for example being a distributed computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A distributed debug system comprising:
a plurality of processing elements connected to sequentially perform a plurality of processing functions on a received data unit, wherein at least a first and a second of said processing elements comprise
a debug trap unit having
a first debug enable input,
a first debug enable output,
a first debug thread comprising at least a first debug trap circuit having a match signal output connected to said first debug enable output and configured to filter at least a part of said data unit, compare a filtering result with a configurable debug value and provide a match signal to said match signal output when a comparison result indicates a successful local match, and
a debug trace dump logic unit configured adapted to dump a configurable amount of debug trace data to a buffer associated with said data unit on reception of a match event; and
a debug initiator unit comprising
a debug initiator output connected to said first debug enable input of said debug trap unit of said first processing element, and
a debug initiator input connected to said first debug enable output of said debug trap unit of said second processing element.

2. The distributed debug system as claimed in claim 1 wherein said first debug enable output of the debug trap unit of said first processing element is connected to said first debug enable input of the debug trap unit of said second processing element.

3. The distributed debug system as claimed in claim 2, wherein said first debug thread of at least one of said processing elements further comprises:
at least a second debug trap circuit, wherein
each of said first and second debug trap circuits comprises a match signal input, a match signal output, an AND/OR input and an AND/OR output, and
said inputs of said second debug trap circuit are connected to corresponding outputs of said first debug trap circuit.

4. The distributed debug system as claimed in claim 1 wherein said first debug thread of at least one of said processing elements further comprises:
at least a second debug trap circuit, wherein
each of said first and second debug trap circuits comprises a match signal input, a match signal output, an AND/OR input and an AND/OR output, and
said inputs of said second debug trap circuit are connected to corresponding outputs of said first debug trap circuit.

5. The distributed debug system as claimed in claim 1 wherein said debug trap unit further comprises:
   at least a second debug thread;
   a second debug enable input; and
   a second debug enable output.

6. The distributed debug system as claimed in claim 5 wherein the debug trap unit further comprises:
   a trap reassignment logic circuit configured to connect at least one debug trap circuit comprised in one of said debug threads to a debug trap circuit comprised in another of said debug threads when said one of said debug threads is in an always-match condition.

7. The distributed debug system as claimed in claim 1 further comprising a shared storage memory configured to store accumulated debug data.

8. The distributed debug system as claimed in claim 1, wherein a trap selection logic is configured to control different data unit parts processed by different debug trap circuits that coherently relate to the same said data unit.

9. The distributed debug system as claimed in claim 1, comprising a debug dump circuit configured to transfer accumulated debug trace data and said data unit associated with said debug trace data to an analyzer unit.

10. The distributed debug system as claimed in claim 9, wherein said analyzer unit is located on the same semiconductor chip as the distributed debug system.

11. The distributed debug system as claimed in claim 9, wherein said analyzer unit is located off a semiconductor chip comprising the distributed debug system.

12. The distributed debug system as claimed in claim 1, wherein said debug trace dump logic unit is configured to set different levels of verbosity of said debug trace data.

13. The distributed debug system as claimed in claim 1, wherein said system is an embedded system.

14. A non-transitory computer readable storage medium, storing instructions executable by one or more of a plurality of processing elements connected to sequentially perform a plurality of processing functions on a received data unit, the instructions configured to perform steps comprising:
   filtering at least a part of said received data unit;
   comparing a result of said filtering with a configurable debug value;
   providing a match signal to a match signal output when a comparison result indicates a successful local match, wherein
      said match signal output is connected to a first debug enable output, and
      said filtering, comparing, and providing executed by a first debug thread of a debug trap unit performed on at least a first and a second of said plurality of processing elements; and
   dumping a configurable amount of debug trace data to a buffer associated with said received data unit, in response to said match signal, wherein said dumping is executed by a debug trace logic unit performed on at least the first and the second of said plurality of processing elements.

15. The non-transitory computer readable storage medium of claim 14, storing further instructions, the further instructions configured to perform steps comprising:
   transferring accumulated debug trace data and said data unit associated with said debug trace data to an analyzer unit, wherein said transferring instructions are executed by a debug dump circuit coupled to the one or more of the plurality of processing elements.

16. The non-transitory computer readable storage medium of claim 14, storing further instructions, the further instructions configured to perform steps comprising:
   connecting at least one debug trap circuit, comprised in the debug thread, to a debug trap circuit comprised in another debug thread when the debug thread is in an always-match condition.

17. A method comprising:
   sequentially performing, at a plurality of processing elements, a plurality of processing functions on a received data unit;
   filtering at least a part of said received data unit;
   comparing a result of said filtering with a configurable debug value;
   providing a match signal to a match signal output when a comparison result indicates a successful local match, wherein
      said match signal output is connected to a first debug enable output, and
      said filtering, comparing, and providing executed by a first debug thread of a debug trap unit performed on at least a first and a second of said plurality of processing elements; and
   dumping a configurable amount of debug trace data to a buffer associated with said received data unit, in response to said match signal, wherein said dumping is executed by a debug trace logic unit performed on at least the first and the second of said plurality of processing elements.

18. The method of claim 17, further comprising:
   transferring accumulated debug trace data and said data unit associated with said debug trace data to an analyzer unit, wherein said transferring instructions are executed by a debug dump circuit coupled to the one or more of the plurality of processing elements.

19. The method of claim 17, further comprising:
   connecting at least one debug trap circuit, comprised in the debug thread, to a debug trap circuit comprised in another debug thread when the debug thread is in an always-match condition.

20. The method of claim 17, further comprising:
   controlling different data unit parts processed by different debug trap circuits that coherently relate to the same said data unit.

* * * * *